US008228630B2

(12) United States Patent
Ajmani et al.

(10) Patent No.: US 8,228,630 B2
(45) Date of Patent: Jul. 24, 2012

(54) CONDUCTIVE PATHS IN A HARD DISK DRIVE ENCLOSURE

(75) Inventors: Ravinder Singh Ajmani, Fremont, CA (US); Andre S. Chan, Milpitas, CA (US); Chisin Chiang, San Jose, CA (US); Ryan Thomas Davis, San Jose, CA (US); Hitoshi Shindo, San Jose, CA (US)

(73) Assignee: Hitachi Global Storage Technologies, Netherlands B.V., Amsterdam (NL)

( * ) Notice: Subject to any disclaimer, the term of this patent is extended or adjusted under 35 U.S.C. 154(b) by 517 days.

(21) Appl. No.: 12/467,176

(22) Filed: May 15, 2009

(65) Prior Publication Data

US 2010/0290329 A1    Nov. 18, 2010

(51) Int. Cl.
*G11B 19/00* (2006.01)
(52) U.S. Cl. ............... 360/88; 360/97.01; 360/97.02
(58) Field of Classification Search ............ 360/88, 360/97.01, 97.02
See application file for complete search history.

(56) References Cited

U.S. PATENT DOCUMENTS

| | | |
|---|---|---|
| 5,187,621 A | 2/1993 | Tacklind |
| 5,448,433 A | 9/1995 | Morehouse et al. |
| 6,310,747 B1 | 10/2001 | Emo et al. |
| 6,388,834 B1 | 5/2002 | Bernett et al. |
| 6,661,603 B1 | 12/2003 | Watkins et al. |
| 7,364,437 B2 * | 4/2008 | Xu et al. ............ 439/76.1 |
| 2007/0201162 A1 | 8/2007 | Deeken |

OTHER PUBLICATIONS

Smith, et al., "Electromagnetic Interference (EMI) Inside a Hard Disk Drive Due to External ESD", *ESD Association*, (2002),1-6.
Gao, Xianke "Numerical Evaluation of EMI Immunity of Hard Disk Drive With Multiple Slots", *Electromagnetic Compatibility. 18th International Zurich Symposium*. (Sep. 2007), 401-404, 24-28.

* cited by examiner

*Primary Examiner* — Hoai V Ho
*Assistant Examiner* — Pablo Huerta

(57) ABSTRACT

A hard disk drive enclosure with conductive paths. A base plate comprising an electrically conductive material with at least one contact surface that allows for an electrically conductive path, wherein the at least one contact surface has a substantially flat surface. A cover comprising an electrically conductive material comprising at least one tab with a substantially flat surface for contacting the at least one contact surface of the base plate, wherein the at least one tab contacts the at least one contact surface of the base plate with a force and forms an electrically conductive path between the cover and the based plate, and wherein the at least one tab deforms upon the contact with the at least one contact surface of the base plate with the force.

19 Claims, 6 Drawing Sheets

500

```
┌─────────────────────────────────────────────────┐
│ A base plate is fabricated to enclose the hard  │
│ disk drive comprising at least one contact      │
│ surface.                                        │
│ 502                                             │
└─────────────────────────────────────────────────┘
                        │
                        ▼
┌─────────────────────────────────────────────────┐
│ A cover is fabricated to cover the base plate   │
│ comprising at least one tab for contacting the  │
│ at least one contact surface of the base        │
│ plate, wherein the at least one tab of the      │
│ cover is substantially coplanar with the cover. │
│ 504                                             │
└─────────────────────────────────────────────────┘
                        │
                        ▼
┌─────────────────────────────────────────────────┐
│ The at least one tab of the cover is aligned    │
│ with the at least one contact surface of the    │
│ base plate.                                     │
│ 506                                             │
└─────────────────────────────────────────────────┘
                        │
                        ▼
┌─────────────────────────────────────────────────┐
│ The base plate is coupled with the cover using  │
│ a force.                                        │
│ 508                                             │
└─────────────────────────────────────────────────┘
                        │
                        ▼
┌─────────────────────────────────────────────────┐
│ The at least one tab of the cover is deformed   │
│ upon contacting the at least one contact        │
│ surface of the base plate with the force.       │
│ 510                                             │
└─────────────────────────────────────────────────┘
          │                              │
          ▼                              ▼
┌──────────────────────────┐  ┌──────────────────────────────┐
│ The base plate is        │  │ The at least one tab of the  │
│ uncoupled with the cover.│  │ cover is permanently         │
│ 514                      │  │ deformed past a yield point. │
│                          │  │ 512                          │
└──────────────────────────┘  └──────────────────────────────┘
          │
          ▼
┌──────────────────────────┐
│ The at least one tab is  │
│ restored to a non-       │
│ deformed shape.          │
│ 516                      │
└──────────────────────────┘
          │
          ▼
┌──────────────────────────┐
│ The base plate is re-    │
│ coupled with the cover   │
│ with a renewed force.    │
│ 518                      │
└──────────────────────────┘
          │
          ▼
┌──────────────────────────┐
│ The at least one tab of  │
│ the cover is re-         │
│ deformed upon re-        │
│ contacting the at least  │
│ one contact surface of   │
│ the base plate with the  │
│ renewed force.           │
│ 520                      │
└──────────────────────────┘
```

```
┌─────────────────────────────────────────────────┐
│      At least one tab of a cover                │
│ is contacted with at least one contact surface  │
│              of a base plate.                   │
│                     602                         │
└─────────────────────────────────────────────────┘
                        ↓
┌─────────────────────────────────────────────────┐
│ The at least one tab of the cover is deformed   │
│ upon the contacting the at least one contact    │
│ surface of the base plate by applying a force   │
│         to the at least one tab of the cover.   │
│                     604                         │
└─────────────────────────────────────────────────┘
                        ↓
┌─────────────────────────────────────────────────┐
│ At least one electrically conductive path is    │
│ formed surrounding the hard disk drive, wherein │
│ the at least one electrically conductive path   │
│ passes through the at least one tab of the      │
│ cover and through the at least one contact      │
│ surface of the base plate.                      │
│                     606                         │
└─────────────────────────────────────────────────┘
                        ↓
┌─────────────────────────────────────────────────┐
│ Operations of the hard disk drive are shielded  │
│ from a range of electromagnetic interference    │
│ contacting the at least one electrically        │
│              conductive path.                   │
│                     608                         │
└─────────────────────────────────────────────────┘
                        ↓
┌─────────────────────────────────────────────────┐
│ Operations of the hard disk drive are immunized │
│ from a range of radio frequencies contacting    │
│ the at least one electrically conductive path.  │
│                     610                         │
└─────────────────────────────────────────────────┘
```

FIG. 6

CONDUCTIVE PATHS IN A HARD DISK DRIVE ENCLOSURE

BACKGROUND ART

At least one hard disk drive (HDD) is used in almost all computer system operations. In fact, most computing systems are not operational without some type of HDD to store the most basic computing information such as the boot operation, the operating system, the applications, and the like. In general, the HDD is a device which may or may not be removable, but without which the computing system will generally not operate.

The HDD may be susceptible to interference during the reading and writing functionality undergone in normal operations. Such interference may come from electromagnetic interference or energy from radio frequencies. This interference may cause poor performance or failures in reading and writing data.

BRIEF DESCRIPTION OF THE DRAWINGS

FIG. 5 is a flowchart of a method for manufacturing and assembling a hard disk drive with conductive paths in accordance with embodiments of the present invention.

FIG. 6 is a flowchart of a method for shielding a hard disk drive in accordance with embodiments of the present invention.

DESCRIPTION OF EMBODIMENTS

Figure 1:
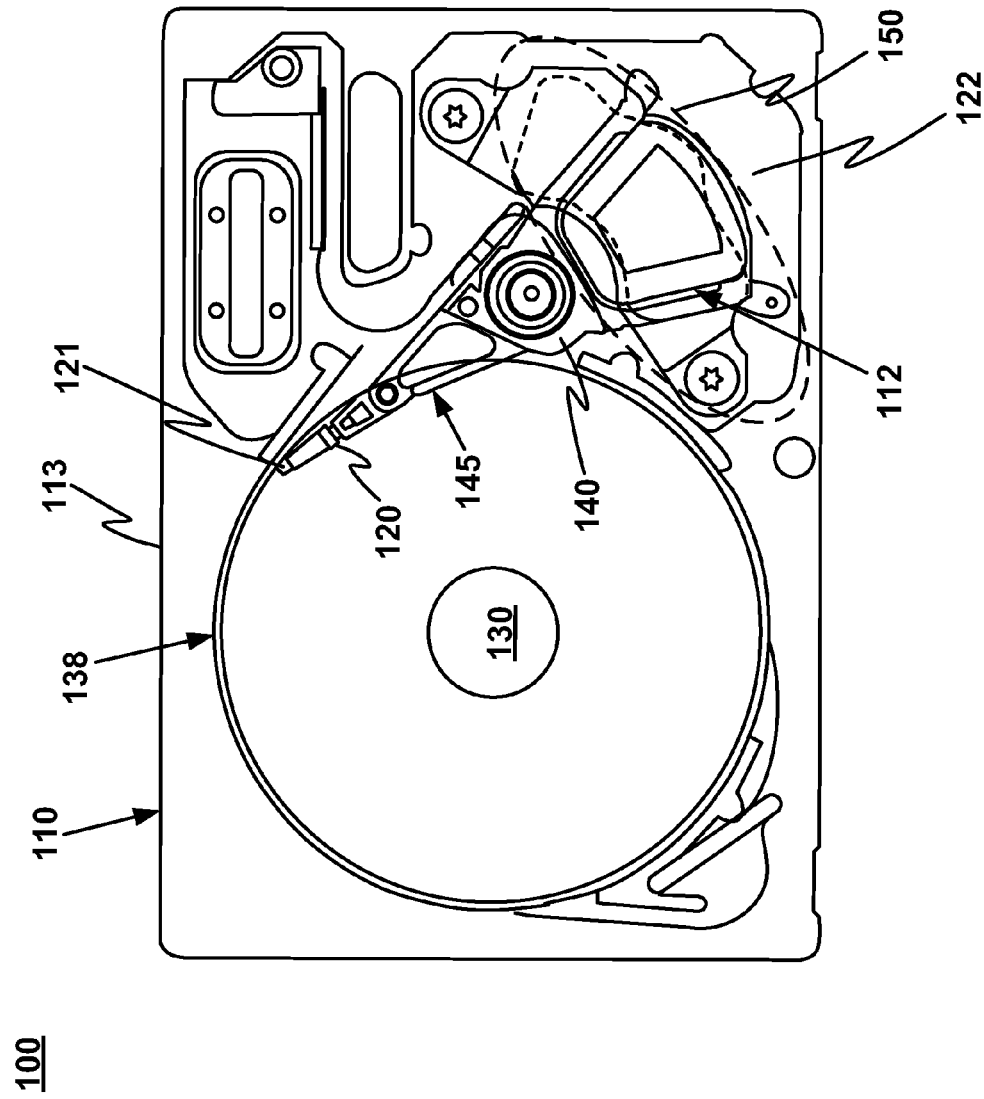
FIG. 1 is a block diagram of an HDD in accordance with embodiments of the present invention.

Reference will now be made in detail to various embodiments of the present invention. While the invention will be described in conjunction with these embodiments, it should be understood that the described embodiments are not intended to limit the invention to these embodiments. On the contrary, the invention is intended to cover alternatives, modifications and equivalents, which may be included within the spirit and scope of the invention as described in the various embodiments and as defined by the appended claims.

Furthermore, in the following description of embodiments, numerous specific details are set forth in order to provide a thorough understanding of various embodiments of the present invention. However, it will be recognized by one of ordinary skill in the art that embodiments of the present invention may be practiced without these specific details. In other instances, well known methods, procedures, components, and circuits have not been described in detail as not to unnecessarily obscure aspects of embodiments of the present invention.

OVERVIEW OF DISCUSSION

The discussion will begin with a brief overview of the present invention. The discussion will then focus on a HDD and components connected therewith. The discussion will then focus on embodiments of conductive paths in a hard disk drive enclosure.

Embodiments of the present invention are for conductive paths in a hard disk drive enclosure. For example, in the operation of a HDD, electromagnetic interference and energy from radio frequencies can disrupt the operation of a HDD. The HDD can be shielded from electromagnetic interference and energy from radio frequencies. In one embodiment, this shielding is accomplished by creating electrically conductive paths through the HDD enclosure. Embodiments of the present invention create tabs connected to the cover of the HDD enclosure which contact surfaces of the base plate of the HDD enclosure. In one embodiment, the tabs of the cover deform upon contacting the surfaces of the base plate with a force. Such deforming ensures a constant contact between the tabs of the cover and the surfaces of the base plate. In one embodiment, the cover and base plate are constructed of electrically conductive metals. Thus when the tabs of the cover contact the surfaces of the base plate and deform, electrically conductive paths are formed. These paths, in one embodiment, create the physical properties necessary to shield the HDD from electromagnetic interference and provide immunity from the energy from radio frequencies.

Operation

The basic HDD model includes a magnetic storage disk or hard disk that spins at a designed rotational speed. An actuator arm with a suspended slider is utilized to reach out over the disk. The slider has one or more magnetic read and write transducers or heads for reading and writing information to or from a location on the disk. The slider is mounted on a suspension which connects to the actuator arm. In the case of multiple platter drives, there can be multiple suspensions attaching to multiple actuator arms as components of a head stack assembly. The head stack assembly also includes a voice coil which is part of a motor used for moving the arms to a desired location on the disk(s).

With reference now to FIG. 1, a schematic drawing of one embodiment of an information storage system including a magnetic hard disk file or HDD 110 for a computer system is shown, although only one head and one disk surface combination are shown. What is described herein for one head-disk combination is also applicable to multiple head-disk combinations. In other words, embodiments of the present technology are independent of the number of head-disk combinations.

In general, HDD 110 has an outer housing 113 usually including a base portion (shown) and a top or cover (not shown). In one embodiment, housing 113 contains a disk pack having at least one media or magnetic disk 138. The disk pack (as represented by disk 138) defines an axis of rotation and a radial direction relative to the axis in which the disk pack is rotatable.

A spindle motor assembly having a central drive hub 130 operates as the axis and rotates the disk 138 or disks of the disk pack in the radial direction relative to housing 113. An actuator assembly 140 includes one or more actuator arms 145. When a number of actuator arms 145 are present, they are usually represented in the form of a comb that is movably or pivotally mounted to base/housing 113. A controller 150 is also mounted to base 113 for selectively moving the actuator arms 145 relative to the disk 138. Actuator assembly 140 may be coupled with a connector assembly, such as a flex cable to convey data between arm electronics and a host system, such as a computer, wherein HDD 110 resides.

In one embodiment, each actuator arm 145 has extending from it at least one cantilevered integrated lead suspension (ILS) 120. The ILS 120 may be any form of lead suspension that can be used in a data access storage device. The level of integration containing the slider 121, ILS 120, and read and write head is called the head stack assembly.

The ILS 120 has a spring-like quality, which biases or presses the air-bearing surface of slider 121 against disk 138 to cause slider 121 to fly at a precise distance from disk 138. ILS 120 has a hinge area that provides for the spring-like quality, and a flexing cable-type interconnect that supports read and write traces and electrical connections through the hinge area. A voice coil 112, free to move within a conventional voice coil motor magnet assembly is also mounted to actuator arms 145 opposite the head stack assemblies. Movement of the actuator assembly 140 causes the head stack assembly to move along radial arcs across tracks on the surface of disk 138. Memory device 122 is capable of storing electronic data that can be used in the operation of HDD 110. Controller 150, and other components of HDD 110, has the ability to access memory device 122 to receive information, data, instruction or commands related to its operation.

Figure 2:
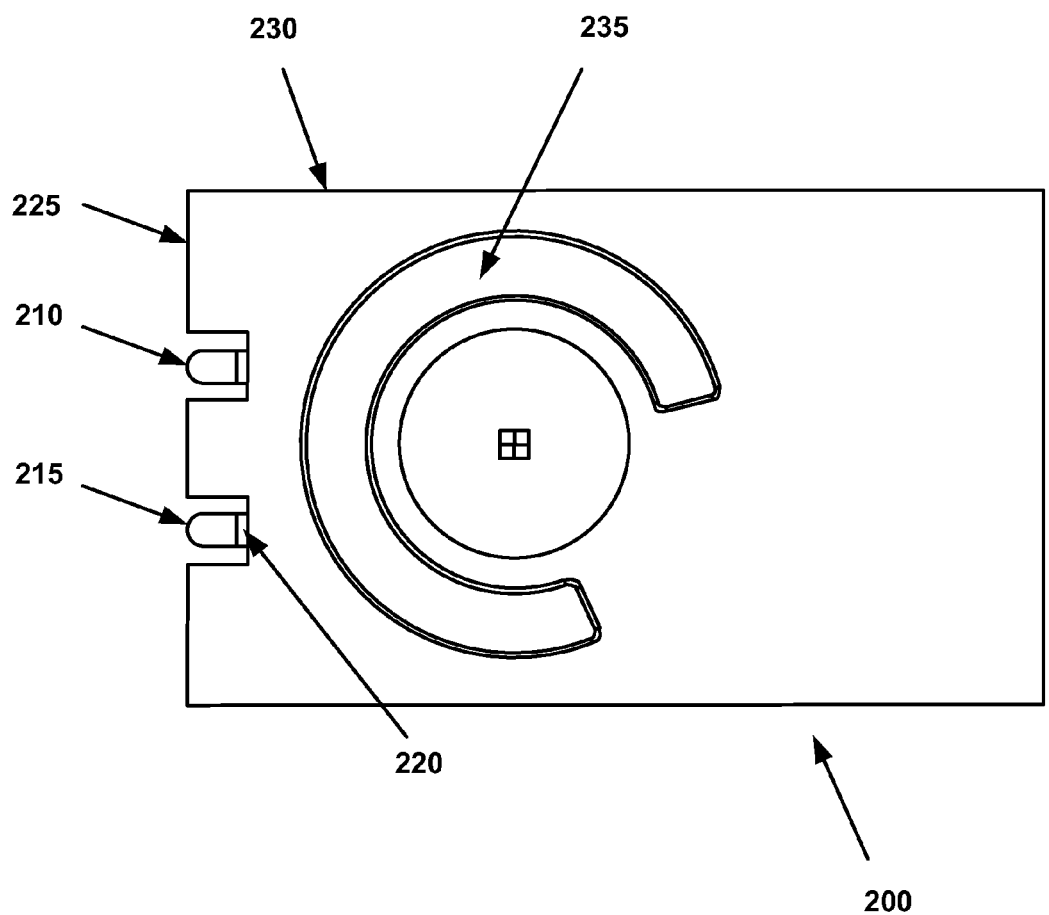
FIG. 2 is a block diagram of a cover for a HDD in accordance with embodiments of the present invention.

Reference will now be made to FIG. 2, a block diagram of an example cover for a HDD enclosure that may be used as a component of HDD 110 of FIG. 1. FIG. 2 depicts, cover 200, tabs 210 and 215, thinner portion 220, short side 225, long side 230, and c-ring 235. FIG. 2 comprises components and portions of the present technology that may or may not be used with different embodiments of the present technology and should not be construed to limit the present technology.

In one embodiment, cover 200 is comprised of a metal material that has electrically conductive properties. It should be appreciated that cover 200 can be any number of metals including, but not limited to stainless steel. In one embodiment, tabs 210 and 215 are fabricated out of the same piece of metal as cover 200. In one embodiment, tabs 210 and 215 are electrically conductive and form an electrically conductive path with cover 200. In one embodiment, cover 200 including tabs 210 and 215 are fabricated by stamping a piece of metal. In one embodiment, the stamping can include a process using die cuts. In one embodiment, no extra processing or steps are needed to fabricate tabs 210 and 215 beyond processing and steps which already occur to fabricate cover 200. It should be appreciated that cover 200 including tabs 210 and 215 can be fabricated using a number of methods including, but not limited to, stamping, machining, and other well known processes for fabricating and shaping metal.

In one embodiment, cover 200 is substantially rectangular in shape having two short sides opposite of each other and two long sides opposite of each other. In one embodiment, short side 225 is one of the two short sides and long side 230 is one of the two long sides. In one embodiment, cover 200 has an embossed or raised portion which forms c-ring 235. In one embodiment, cover 200 is coupled with HDD 110 of FIG. 1 and c-ring 235 is located over magnetic disk 138. In one embodiment, once cover 200 is coupled with a HDD, the magnetic disk of the hard disk drive will be located closer to one of the two shorter sides of cover 200. FIG. 2 depicts an embodiment in which c-ring 235 is located closer to short side 225 than the short side opposite of short side 225.

In one embodiment, cover 200 includes at least one tab such as tab 215. In one embodiment, tab 215 is fabricated to include a length that is perpendicular to short side 225. In one embodiment, tab 215 protrudes in a direction away from short side 225. In one embodiment, tab 215 is fabricated to be substantially coplanar with cover 200. In one embodiment, tab 215 comprises a substantially flat surface that is able to contact another metallic surface and form an electrically conductive path with the other electrically conductive surface. In one embodiment, tab 215 comprises a rounded surface that is able to contact another metallic surface and form an electrically conductive path with the other electrically conductive surface. In one embodiment, the surface of tab 215 is sloped relative to cover 200. In one embodiment, tab 215 includes thinner portion 220 which is composed of a thickness thinner than the remainder portion of tab 215. In one embodiment, thinner portion 220 is the portion of tab 215 which connects tab 215 to cover 200. In one embodiment, thinner portion 220 of tab 215 is formed using a stamping process. It should be appreciated that any combination of surfaces could be used for tab 305 and the contact surface of the base plate. For example, both could have a substantially flat surface, or one could have a rounded surface and the other a sloped surface.

In one embodiment, cover 200 includes only two tabs for forming a conductive path. In one embodiment, tabs are fabricated into cover 200 in predetermined locations which cause the greatest effectiveness in providing shielding from electromagnetic interference and immunity from radio frequencies. In one embodiment, cover 200 includes tabs 210 and 215 which are located on short side 225 which is located closer to c-ring 235 than the other short side located opposite of short side 225. In one embodiment, tabs 210 and 215 are located on short side 225 and are positioned to divide short side 225 into three lengths. In one embodiment, tabs 210 and 215 divide short side 225 into three substantially equal lengths.

In one embodiment, tab 215 is able to deform when in contact with another surface or point and a force is applied. It should be appreciated that such a force can be, but is not limited to, a pressure, an applied load or another type of force applied to tab 215. In one embodiment, such a force is applied to tab 215 when cover 200 is coupled with a base plate of a HDD enclosure. In one embodiment, cover 200 is coupled with a base plate of a HDD enclosure using screws which result in a force applied to tab 215. In one embodiment, tab 215 deforms at thinner portion 220 which is the weakest portion of tab 215 because it is the thinnest portion of tab 215. In one embodiment, tab 215 permanently deforms past a yield point when a force is applied and is unable to return to its original shape once the force is no longer applied. It should be appreciated that cover 200 may be removed if the HDD fails. In such an embodiment, cover 200, with tab 215 which has permanently deformed past a yield point, may be discarded as replaced with a new cover comprising tabs that have not yet been deformed. In one embodiment, tab 215 deforms a distance in a range substantially centered on four hundred microns from its original position relative to cover 200.

Figure 3:
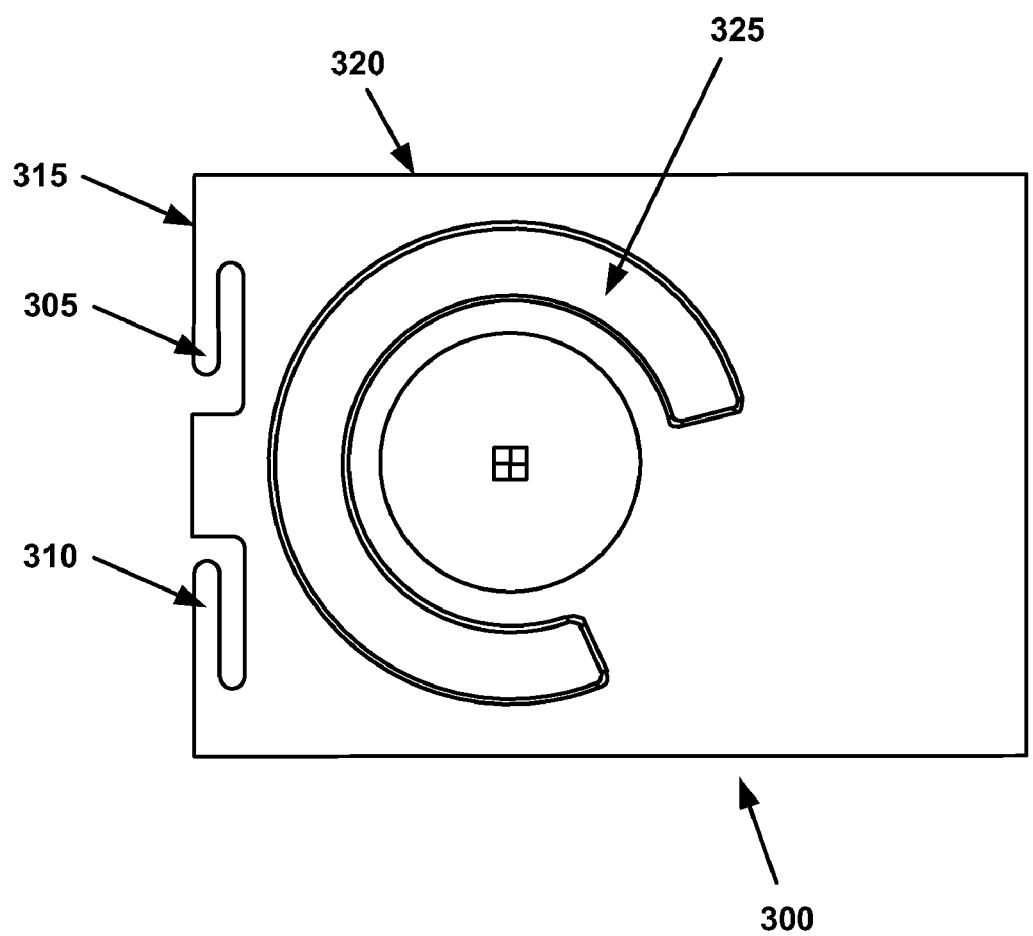
FIG. 3 is a block diagram of a cover for a HDD in accordance with embodiments of the present invention.

Reference will now be made to FIG. 3, a block diagram of an example cover for a HDD enclosure that may be used as a component of HDD 110. FIG. 3 depicts, cover 300, tabs 305 and 310, short side 315, long side 320, and c-ring 325. FIG. 3 comprises components and portions of the present technology that may or may not be used with different embodiments of the present technology and should not be construed to limit the present technology.

In one embodiment, cover 300 is comprised of the same materials as cover 200 of FIG. 2. In one embodiment, tabs 305 and 310 are fabricated out of the same piece of metal as cover 300. In one embodiment, tabs 305 and 310 are electrically conductive and form an electrically conductive path with cover 300. In one embodiment, cover 300 including tabs 305 and 310 are fabricated by stamping a piece of metal. In one embodiment, the stamping can include a process using die cuts. In one embodiment, no extra processing or steps are needed to fabricate tabs 305 and 310 beyond processing and steps which already occur to fabricate cover 300. It should be appreciated that cover 300 including tabs 305 and 310 can be fabricated using a number of methods including, but not limited to, stamping, machining, and other well known processes for fabricating and shaping metal.

In one embodiment, cover 300 is substantially rectangular in shape having two short sides opposite of each other and two long sides opposite of each other. In one embodiment, short side 315 is one of the two short sides and long side 320 is one of the two long sides. In one embodiment, cover 300 has an embossed or raised portion which forms c-ring 325. In one embodiment, cover 300 is coupled with HDD 110 of FIG. 1 and c-ring 325 is located over magnetic disk 138. In one embodiment, once cover 300 is coupled with a HDD, the magnetic disk of the hard disk drive will be located closer to one of the two shorter sides of cover 300. FIG. 3 depicts an embodiment in which c-ring 325 is located closer to short side 315 than the short side opposite of short side 315.

In one embodiment, cover 300 includes at least one tab such as tab 305. In one embodiment, tab 305 is fabricated to include a length that is parallel to short side 315. In one embodiment, a side of tab 305 forms a portion of short side 315 of cover 300. In one embodiment, tab 305 is fabricated to be substantially coplanar with cover 305. In one embodiment, tab 305 comprises a substantially flat surface that is able to contact another metallic surface and form an electrically conductive path with the other electrically conductive surface. In one embodiment, tab 305 comprises a rounded surface that is able to contact another metallic surface and form an electrically conductive path with the other electrically conductive surface. In one embodiment, the surface of tab 305 is sloped relative cover 300. In one embodiment, by using a substantially flat surface for both tab 305 and a contact surface of a base plate, an electrically conductive path is ensured when the two substantially flat surfaces contact each other. It should be appreciated that any combination of surfaces could be used for tab 305 and the contact surface of the base plate. For example, both could have a substantially flat surface, or one could have a rounded surface and the other a sloped surface.

In one embodiment, tabs are fabricated into cover 300 in predetermined locations which cause the greatest effectiveness in providing shielding from electromagnetic interference and immunity from radio frequencies. In one embodiment, cover 300 includes only two tabs for forming a conductive path. In one embodiment, cover 300 includes tabs 305 and 310 which are located on short side 315 which is located closer to c-ring 325 than the other short side located opposite of short side 315. In one embodiment, tabs 305 and 310 are located on short side 315 and are positioned to divide short side 315 into three lengths. In one embodiment, tabs 305 and 310 divide short side 315 into three substantially equal lengths.

In one embodiment, tab 305 is able to deform when in contact with another surface or point and a force is applied. In one embodiment, tab 305 is deformed so that it is no longer coplanar with cover 300. It should be appreciated that such a force can be, but is not limited to, a pressure, an applied load or another type of force applied to tab 305. In one embodiment, such a force is applied to tab 305 when cover 300 is coupled with a base plate of a HDD enclosure. In one embodiment, cover 300 is coupled with a base plate of a HDD enclosure using screws which result in a force applied to tab 305. In one embodiment, tab 305 permanently deforms past a yield point when a force is applied and is unable to return to its original shape once the force is no longer applied. In one embodiment, tab 305 deforms a distance in a range substantially centered on four hundred microns from its original position relative to cover 300.

In one embodiment, tab 305 deforms when in contact with another surface or point and a force is applied but restores to a non-deformed shape once the force is no longer applied. In one embodiment, tab 305 is able to then deform again when in renewed contact with the other surface or point and a renewed force is applied. In one embodiment, tab 305 is able to restore to a non-deformed shape or an original shape because tab 305 is not deformed past a yield point. In one embodiment, tab 305 is able to restore to a non-deformed shape or an original shape due to a restorative or spring force inherent in the material of which tab 305 comprises. In one embodiment, the deformation is spread along the length of tab 305, thus if tab 305 is longer enough the deformation will not extend tab 305 past a yield point. In this manner, tab 305 is allowed more deflection before reaching a yield point. Thus, tab 305 is able to deform each instance cover 300 is coupled with a base plate of a HDD enclosure. In other words, cover 300 can be used more than once with the same effects as in the first use.

It should be appreciated that an embodiment that allows cover 300 to be used more than once is desirable for a HDD that has failed and is in need of rework or repair. For example, a component part of a HDD may fail and must be replaced for the HDD to operate normally. In this example, cover 300 may be removed, the component replaced or repaired, and cover 300 is then replaced with the tabs deforming again upon renewed contact with the contact surfaces. In this manner, cover 300 does not need to be discarded each instance in which the HDD enclosure is disassembled and reassembled.

In one embodiment, tab 305 is deformed after fabrication, but before coupling with a contact surface, to bend tab 305 so that it is not coplanar with cover 300. For example, tab 305 can be bent away from cover 300 and in the direction in which tab 305 will contact a contact surface of a base plate. Such deforming or bending in a direction toward a contact surface will ensure contact between tab 305 and a contact surface of a base plate.

Figure 4:
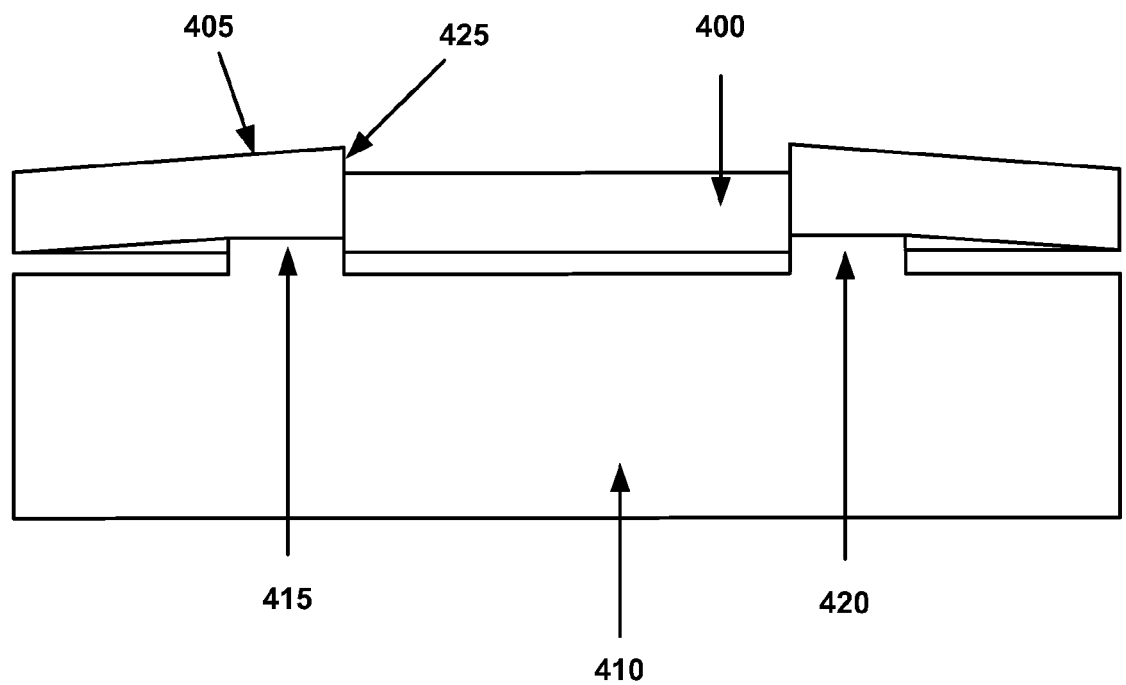
FIG. 4 is a block diagram of an enclosure for a HDD in accordance with embodiments of the present invention.

Reference will now be made to FIG. 4, a side view of a block diagram of an example cover and base plate for a HDD enclosure that may be used as components of HDD 110. FIG. 4 depicts, cover 400, tab 405, base plate 410, and contact surfaces 415 and 420. FIG. 4 comprises components and portions of the present technology that may or may not be used with different embodiments of the present technology and should not be construed to limit the present technology.

In one embodiment, cover 400 possesses characteristics similar to those described above for cover 200 of FIG. 2 and cover 300 of FIG. 3. In one embodiment, tab 405 possesses characteristics similar to that of tab 305 of FIG. 3.

In one embodiment, base plate 410 is comprised of a metal material that has electrically conductive properties. It should be appreciated that base plate 410 can be any number of metals including, but not limited to aluminum. In one embodiment, contact surfaces 415 and 420 are fabricated out of the same piece of metal as base plate 410. In one embodiment, contact surfaces 415 and 420 exposed metal and are electrically conductive and form an electrically conductive path with base plate 410. In one embodiment, contact surfaces 415 and 420 comprise substantially flat surfaces and are able to easily contact the flat surface of a tab of a cover such as tab 405. It should be appreciated that the surfaces of contact surfaces of 415 and 420 can be any number of shapes including substantially flat surfaces, a rounded boss or surface, a sloped boss or surface, etc. FIG. 4 depicts an embodiment in which the substantially flat surfaces of contact surfaces 415 and 420 are raised surfaces that are different in height than the other surfaces of base plate 410.

In one embodiment, base plate 410 is substantially rectangular in shape with two short sides opposite of each other similar to those described for cover 200 of FIG. 2 and cover 300 of FIG. 3. In one embodiment, base plate 410 is designed couple with cover 400. In one embodiment, base plate 410 is coupled with magnetic disk 138 of FIG. 1. In one embodiment, magnetic disk 138 is located closer to one of the two short sides of base plate 410. In one embodiment, base plate 410 has only two contact surfaces 415 and 420 which are located on the short side of base plate 410 closest to magnetic disk 138. In one embodiment, contact surfaces 415 and 420 are located on one of the short sides of base plate 410. In one embodiment, contact surfaces 415 and 420 are positioned to divide one of the short sides of base plate 410 into three lengths. In one embodiment, contact surfaces 415 and 420 divide one of the short sides of base plate 410 into three substantially equal lengths.

FIG. 4 depicts an embodiment in which cover 400 is in contact with base plate 410. In one embodiment, this contact is made via tab 405 and contact surface 415. FIG. 4 depicts an embodiment in which tab 405 is deformed upon contacting contact surface 415 with an applied force. Deformation point 425 depicts an embodiment in which tab 405 has deformed relative to cover 400.

In one embodiment, at least one conductive path is formed which passes through cover 400, the surface of tab 405, the surface of contact surface 415, and base plate 410. In one embodiment, this conductive path provides shielding from a range of electromagnetic interference. In one embodiment, this conductive path provides immunity from energy from a range of radio frequencies. In one embodiment, the range of radio frequencies is frequencies which are less than two gigahertz. Thus at least one electrically conductive path is formed through a HDD enclosure.

FIG. 5 is a flowchart of method 500 for manufacturing and assembling a hard disk drive with conductive paths in accordance with embodiments of the present invention.

At 502, a base plate is fabricated to enclose the hard disk drive comprising at least one contact surface.

At 504, a cover is fabricated to cover the base plate comprising at least one tab for contacting the at least one contact surface of the base plate, wherein the at least one tab of the cover is substantially coplanar with the cover. In one embodiment, the cover is fabricated using a stamping process.

At 506, the at least one tab of the cover is aligned with the at least one contact surface of the base plate.

At 508, the base plate is coupled with the cover using a force.

At 510, the at least one tab of the cover is deformed upon contacting the at least one contact surface of the base plate with the force. In one embodiment, the at least one tab of the cover is deformed at a thinner portion of the at least one tab. In one embodiment, the at least one tab of the cover is deformed a range substantially centered on four hundred microns relative to the cover.

At 512, in one embodiment, the at least one tab of the cover is permanently deformed past a yield point.

At 514, in one embodiment, the base plate is uncoupled with the cover.

At 516, in one embodiment, the at least one tab is restored to a non-deformed shape.

At 518, in one embodiment, the base plate is re-coupled with the cover with a renewed force.

At 520, in one embodiment, the at least one tab of the cover is re-deformed upon re-contacting the at least one contact surface of the base plate with the renewed force.

FIG. 6 is a flowchart of method 600 for shielding a hard disk drive in accordance with embodiments of the present invention.

At 602, at least one tab of a cover is contacted with at least one contact surface of a base plate.

At 604, the at least tab of the cover is deformed upon the contacting the at least one contact surface of the base plate by applying a force to the at least one tab of the cover.

At 606, at least one electrically conductive path is formed surrounding the hard disk drive, wherein the at least one electrically conductive path passes through the at least one tab of the cover and through the at least one contact surface of the base plate.

At 608, in one embodiment, operations of the hard disk drive are shielded from a range of electromagnetic interference contacting the at least one electrically conductive path.

At 610, in one embodiment, operations of the hard disk drive are immunized from a range of radio frequencies contacting the at least one electrically conductive path. In one embodiment, the range of radio frequencies the hard disk drive is immunized from is less than two gigahertz.

Thus, embodiments of the present invention provide an airflow diverter in a hard disk drive system.

Example embodiments of the present technology are thus described. Although the subject matter has been described in a language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed:

1. A hard disk drive enclosure with conductive paths, comprising:
    a base plate comprising an electrically conductive material with at least one contact surface that allows for an electrically conductive path; and
    a cover comprising an electrically conductive material comprising at least one tab for contacting said at least one contact surface of said base plate, wherein said at least one tab contacts said at least one contact surface of said base plate with a force and forms an electrically conductive path between said cover and said based plate, and wherein said at least one tab deforms upon said contact with said at least one contact surface of said base plate with said force, said force provided by said tab and wherein said at least one tab comprises a substantially flat surface for contacting said at least one contact surface.

2. The hard disk drive enclosure of claim 1, wherein said at least one tab comprises a rounded surface for contacting said at least one contact surface.

3. The hard disk drive enclosure of claim 1, wherein said base plate is substantially rectangular in shape, wherein said at least one contact surface of said base plate is located on a short side of said base plate, and wherein said cover is substantially similar in shape to said base place and said at least one tab of said cover is positioned to contact said contact surface of said base plate, further comprising:
    at least one magnetic disk coupled with said base plate, wherein said at least one magnetic disk is located closer to said short side.

4. The hard disk drive enclosure of claim 3, wherein said base plate comprises two contact surfaces located on a short side of said base plate and wherein said cover comprises two tabs positioned to contact said two contact surfaces of said base plate.

5. The hard disk drive enclosure of claim 4 wherein said two contact surfaces are positioned is such a manner that said two contact surfaces divide said short side into three substantially equal lengths.

6. The hard disk drive enclosure of claim 3, wherein said at least one tabs has a length which extends parallel to said short side of said cover plate.

7. The hard disk drive enclosure of claim 3, wherein said at least one tab has a length which extends perpendicular to said short side of said cover plate.

8. The hard disk drive enclosure of claim 7, wherein a portion of said length of said at least one tab is a thinner portion which is thinner than a remainder of said length of said at least one tab is such a way that said at least one tab deforms at said thinner portion once said at least one tab upon said contact with said at least one contact surface of said base plate with said force.

9. The hard disk drive enclosure of claim 1, wherein said at least one tab permanently deforms past a yield point upon said contact with said at least one contact surface of said base plate with said force.

10. The hard disk drive enclosure of claim 1, wherein said at least one tab restores to a non-deformed shape after said contact with said at least one contact surface of said base plate with said force is ended and deforms again upon a renewed contact with said at least one contact surface of said base plate with a renewed force.

11. The method of claim 10, wherein said deforming said at least one tab of said cover upon contacting said at least one contact surface of said base plate with said force takes place at a thin portion of said at least one tab that is thinner than the other portions of said at least one tab.

12. The hard disk drive enclosure of claim 1, further comprising:
   at least one electrically conductive path for shielding said hard disk drive from a range of electromagnetic interference and providing immunity to a range of radio frequencies, wherein said at least one electrically conductive path passes through said at least one tab of said cover and through said at least one contact surface of said base plate.

13. A method for manufacturing and assembling a hard disk drive with conductive paths, said method comprising:
   fabricating a base plate to enclose said hard disk drive comprising at least one contact surface;
   fabricating a cover to cover said base plate comprising at least one tab with a substantially flat surface for contacting said at least one contact surface of said base plate, wherein said at least one tab of said cover is substantially coplanar with said cover;
   aligning said at least one tab of said cover with said at least one contact surface of said base plate;
   coupling said base plate with said cover using a force; and
   deforming said at least one tab of said cover upon contacting said at least one contact surface of said base plate with said force, said force provided by said tab and wherein said at least one tab comprises a substantially flat surface for contacting said at least one contact surface.

14. The method of claim 13 wherein said fabricating said cover with said at least one tab is accomplished using stamping.

15. The method of claim 13 wherein said deforming said at least one tab of said cover permanently deforms said at least one tab past a yield point.

16. The method of claim 13, further comprising:
   uncoupling said base plate with said cover;
   restoring said at least one tab to a non-deformed shape;
   re-coupling said base plate with said cover with a renewed force; and
   re-deforming said at least one tab of said cover upon re-contacting said at least one contact surface of said base plate with said renewed force.

17. A method for shielding a hard disk drive, said method comprising:
   contacting at least one tab of a cover with at least one contact surface of a base plate, wherein said at least one tab comprises a substantially flat surface for contacting said contact surface of said base plate;
   deforming said at least tab of said cover upon said contacting said at least one contact surface of said base plate by a force at said at least one tab of said cover; and
   forming at least one electrically conductive path surrounding said hard disk drive, wherein said at least one electrically conductive path passes through said at least one tab of said cover and through said at least one contact surface of said base plate, said force provided by said tab.

18. The method of claim 17, further comprising;
   shielding operations of said hard disk drive from a range of electromagnetic interference contacting said at least one electrically conductive path.

19. The method of claim 17, further comprising;
   immunizing operations of said hard disk drive from a range of radio frequencies contacting said at least one electrically conductive path.

* * * * *